US012358309B2

(12) United States Patent
Campbell

(10) Patent No.: US 12,358,309 B2
(45) Date of Patent: Jul. 15, 2025

(54) PRINTHEAD ADJUSTMENT APPARATUS

(71) Applicant: AGFA N.V., Mortsel (BE)

(72) Inventor: Nicholas John Campbell, Cambridge (GB)

(73) Assignee: AGFA N.V., Mortsel (BE)

( * ) Notice: Subject to any disclaimer, the term of this patent is extended or adjusted under 35 U.S.C. 154(b) by 0 days.

(21) Appl. No.: 16/973,264

(22) PCT Filed: Jun. 7, 2019

(86) PCT No.: PCT/GB2019/051594

§ 371 (c)(1),
(2) Date: Dec. 8, 2020

(87) PCT Pub. No.: WO2019/234450

PCT Pub. Date: Dec. 12, 2019

(65) Prior Publication Data

US 2021/0245532 A1 Aug. 12, 2021

(30) Foreign Application Priority Data

Jun. 8, 2018 (GB) ...................................... 1809435

(51) Int. Cl.
*B41J 25/00* (2006.01)

(52) U.S. Cl.
CPC .................................. *B41J 25/001* (2013.01)

(58) Field of Classification Search
None
See application file for complete search history.

(56) References Cited

U.S. PATENT DOCUMENTS 6,351,330 B2 * 2/2002 Ko ..................... G02B 26/0841 359/224.1
2002/0191049 A1 12/2002 Silverbrook
(Continued)

FOREIGN PATENT DOCUMENTS

| | | | |
|---|---|---|---|
| EP | 0693382 | A1 | 1/1996 |
| GB | 2528843 | A | 2/2016 |
| WO | 2017205499 | A1 | 11/2017 |

OTHER PUBLICATIONS

GB Patents Act 1977: Combined Search and Examination Report under Sections 17 and 18(3), Application No. 1809435.9, dated Nov. 30, 2018.

(Continued)

*Primary Examiner* — Alejandro Valencia
(74) *Attorney, Agent, or Firm* — MacMillan, Sobanski & Todd, LLC

(57) ABSTRACT

A printhead adjustment apparatus for adjusting the translation and rotation of a printhead is provided. The apparatus comprises a first portion and a second portion, each arranged for coupling to the printhead. The apparatus also comprises a first actuator coupled to the first portion by a first flexure arrangement and a second actuator coupled to the second portion by a second flexure arrangement. Translation of the first and second actuators in the same direction as each other causes translation of the first and second portions in the same direction as each other to provide translation of the printhead, while translation of the first and second actuators in opposite directions to each other causes translation of the first and second portions in opposite directions to each other to provide rotation of the printhead.

15 Claims, 5 Drawing Sheets

(56) References Cited

U.S. PATENT DOCUMENTS

| | | | | |
|---|---|---|---|---|
| 2006/0077225 | A1* | 4/2006 | Song | B41J 2/15 347/40 |
| 2006/0139400 | A1 | 6/2006 | Nellen | |
| 2010/0182382 | A1 | 7/2010 | Lee et al. | |
| 2017/0080728 | A1 | 3/2017 | Elferink | |

OTHER PUBLICATIONS

PCT Search Report and Written Opinion, Application No. PCT/GB2019/051594, dated Jul. 11, 2019.

* cited by examiner

PRINTHEAD ADJUSTMENT APPARATUS

The present invention relates to a printhead adjustment attachment for adjusting the translation and rotation of a printhead.

Printers are well-known devices for applying text and graphic images to a variety of substrates. A wide variety of different printers are available which are suitable for printing onto different types and sizes of substrate.

Large-scale industrial printers are adapted to print images onto larger substrates than, for example, office-based printers used for printing onto A4-size paper. Large-scale printers may be used for printing onto, for example, advertising boards, posters, and/or large batches of smaller substrates.

In an inkjet printing process, droplets of ink are deposited onto the surface of a substrate in a pattern to form the required image. The droplets of ink are typically emitted from a plurality of nozzles on an inkjet printhead. A typical printer includes several printheads arranged along a print carriage. For example, the print carriage may be up to around 2 m in width. A print carriage may have up to 150 printheads. Printer manufacturers aim to provide a dense and continuous array of printheads across the whole width of the print carriage. Usually, the printheads are arranged in multiple rows to give a 2-D array of printheads.

Recent advances in inkjet printhead manufacture have allowed manufacturers to integrate several thousand inkjet nozzles on a single printhead: this is frequently achieved by arranging the nozzles in a 2-D grid pattern.

In order to achieve good positional registration (i.e. relative positioning) between nozzles within a printhead, the correct angle of rotation of the printheads in the plane of the nozzles of the printheads should be established. When the printhead is correctly rotationally aligned, the lines of ink laid down by the nozzles are equally spaced. However, if the array of nozzles is rotated and incorrectly rotationally aligned, the printed lines of ink are no longer equally spaced.

In addition to the rotation of the printhead, translational alignment should also be considered. Registration between printheads, in the printing process direction, may be achieved by altering the firing times of the individual printheads, and vertical positioning and other rotations can be set by manufacturing tolerances. However, as printheads with higher resolutions and smaller drop sizes are developed, rotational and translational positioning are difficult to achieve using standard manufacturing tolerances so some degree of mechanical adjustment can be used to enable alignment of the printheads within the print carriage.

Printheads are usually manufactured individually and fixed to a print carriage, on which they are aligned. Some printheads are modular, with every printhead individually replaceable in the field, requiring them to be individually adjustable for alignment. While technically challenging, this can provide improvements in the accuracy of alignment, because there is no stack up of tolerances, and because the final adjustment is done with the head in its operating condition. This also means that the final printed position of droplets is used for alignment, rather than nozzle position, so it includes any systematic jet deviations. A typical print carriage may have around 150 printheads, and the initial aligning and maintaining the alignment of that number of printheads is quite a demanding task.

Further, when building large arrays of printheads, it is desirable to make the assembly as compact as is reasonably possible, as this improves the registration between printheads both within and between colours. However, this also means it is more difficult to make adjustments.

When using a single pass printer comprising an array of printheads arranged in an arc-like shape around a cylindrical drum, adjustment is particularly difficult. Space can be especially tight, and adjustment at the plane of the printheads is extremely difficult.

Disclosed herein is a printhead adjustment apparatus for adjusting the translation and rotation of a printhead, comprising: a first portion arranged for coupling to the printhead; a second portion arranged for coupling to the printhead; a first actuator coupled to the first portion by a first flexure arrangement; a second actuator coupled to the second portion by a second flexure arrangement; wherein translation of the first and second actuators in the same direction as each other causes translation of the first and second portions in the same direction as each other to provide translation of the printhead; and wherein translation of the first and second actuators in opposite directions to each other causes translation of the first and second portions in opposite directions to each other to provide rotation of the printhead.

As used herein, translation of the actuator may comprise movement in a short arc of rotation in the plane of the apparatus. For example, the actuator comprises an arm which is rotatable around a first pivot relative to a central body.

Optionally, each flexure arrangement comprises at least two flexural pivots. The flexural pivot may also be described as a flexure. This may be a bendable filament, configured to bend or flex under the application of a force. The flexural pivot may be long and thin such that it is adapted to flex in a horizontal direction, and tall and rigid such that it is adapted to not flex in a vertical direction.

Optionally, the flexure arrangements are formed from the same body as the printhead adjustment apparatus. For example, the flexures may be formed by cutting sections out of the body.

Optionally, the first and second portions are arranged in the same plane. For example, in use, this may be a horizontal plane. In some examples, this may be a plane parallel to the printheads, in particular the plane of the array of nozzles of the printhead. This may also be perpendicular to the printing plane (e.g. a tangent of a cylindrical drum).

Optionally, the translation of the first actuator causes translation of the first portion in substantially the same direction as the translation of the first actuator.

Optionally, the translation of the second actuator causes translation of the second portion in substantially the same direction as the translation of the second actuator.

Optionally, exclusive translation is achieved if the magnitude and direction of the translation of the first actuator is equal to the translation of the second actuator. This assumes that the reduction ratio (as described below) between the first actuator and the first portion is equal to the reduction ratio between the second actuator and the second potion.

Optionally, exclusive rotation is achieved if the magnitude of the translation of the first actuator is equal to the translation of the second actuator and the direction of the translation of the first actuator is opposite to the translation of the second actuator. This assumes that the reduction ratio (as described below) between the first actuator and the first portion is equal to the reduction ratio between the second actuator and the second potion.

Optionally, the translation of the first actuator occurs in the same plane as the translation of the second actuator. Optionally, the translation of the first portion occurs in the same plane as the translation of the second portion. Optionally, the translation of the first and second portions occurs in the same plane as the translation of the first and second actuators. Optionally, the rotation and translation of the printhead occur in the same plane.

Optionally, the printhead adjustment apparatus further comprises a central body arranged between the first actuator and the second actuator.

Optionally, more than one of the following are formed from the same body: the first and second portions, the first and second flexure arrangements, the central body, and/or the first and second actuators.

Optionally, the printhead adjustment apparatus further comprises a first pivot arranged between the first actuator and the central body for converting the translation of the first actuator into translation of the first portion via the first flexure arrangement, optionally wherein the first pivot is a flexural pivot. In some examples, the first pivot may be considered part of the first flexural arrangement.

Optionally, the printhead adjustment apparatus further comprises a second pivot arranged between the second actuator and the central body for converting the translation of the second actuator into translation of the second portion via the second flexure arrangement, optionally wherein the second pivot is a flexural pivot. In some examples, the second pivot may be considered part of the second flexural arrangement.

Optionally, translation of the first actuator causes rotation of the first actuator about the first pivot and wherein the first flexure arrangement is configured to convert the rotation of the first actuator into translation of the first portion. In some examples, the rotation may predominantly comprise a component in the first or second direction.

Optionally, translation of the second actuator causes rotation of the second actuator about the second pivot and wherein the second flexure arrangement is configured to convert the rotation of the second actuator into translation of the second portion. In some examples, the rotation may predominantly comprise a component in the first or second direction.

Optionally, the first flexure arrangement is configured to provide a reduction ratio such that the magnitude of the translation of the first portion and the magnitude of the translation of the first actuator are in a ratio of less than one.

Optionally, the second flexure arrangement is configured to provide a reduction ratio such that the magnitude of the translation of the second portion and the magnitude of the translation of the second actuator are in a ratio of less than one.

The reduction ratio is achieved by positioning the flexure arrangement at a position along the actuator closer to the pivot than the position at which the actuator is translated. For example, the lever mechanism may provide a reduction ratio of about 3:1.

Optionally, the printhead adjustment apparatus further comprises a printhead coupled to the first and second portions, wherein the printhead comprises an array of nozzles for depositing ink, the array of nozzles arranged in a plane.

Optionally, the printhead adjustment apparatus further comprises a printhead coupler coupled to and arranged between the printhead and the first and second portions, optionally wherein the printhead coupler is configured to couple the translation and/or rotation of the first and second portions to the printhead.

Optionally, in use, the printhead adjustment apparatus is mounted on the reverse side of the printhead to the array of nozzles.

Optionally, in use, the printhead adjustment apparatus is mounted above the printhead such that the printhead is operable to be adjusted from above.

Optionally, the first and second portions are arranged in a plane parallel to the array of nozzles of the printhead.

Optionally, the translation of the first and second portions occurs in a plane parallel to the array of nozzles of the printhead.

Optionally, the first and second portions are constrained to move predominantly in a plane parallel to the array of nozzles of the printhead.

Optionally, the first and second portions are each constrained to move predominantly in a first direction and a second direction, wherein the second direction is opposite to the first direction. When the first and second portions are rigidly coupled (for example via a printhead), the combined first/second portion is constrained to move predominantly in the x-axis, and rotate in the x-y plane.

Optionally, the first and/or second portions are constrained to inhibit movement in a third direction which is perpendicular to the first direction and is in the plane in which the translation and/or rotation occurs.

Optionally, the first and/or second portion is coupled to a third flexure arrangement configured to constrain the respective portion to inhibit movement in the third direction.

Optionally, the first flexure arrangement is arranged such that a translation of the first actuator produces a force on the first portion such that the force causes the first portion to be translated in the same direction as the translation of the first actuator.

Optionally, the second flexure arrangement is arranged such that a translation of the second actuator produces a force on the second portion such that the force causes the second portion to be translated in the same direction as the translation of the second actuator.

Optionally, the printhead adjustment apparatus has a cross-sectional footprint in a plane parallel to the array of nozzles of the printhead which is the same or smaller than the footprint of the printhead in the plane of the array of nozzles of the printhead. Optionally, the footprint shape is a parallelogram or square or rectangle or other trapezoid shape. Optionally, the printhead adjustment apparatus retains the printhead in a fixed position after adjustment without an additional locking mechanism.

Optionally, the first and/or second actuator comprises an adjuster screw arranged such that rotation of the adjuster screw provides translation of the first and/or second actuator.

Optionally, the first and second actuators are controlled by at least one motor, optionally wherein the at least one motor is controlled by a processor.

Optionally, the at least one motor is in communication with the adjuster screw and is operable to rotate the adjuster screw.

Optionally, the printhead adjustment apparatus is configured for use in an inkjet printer. In some examples, the printhead comprises an array of nozzles for depositing ink, for example onto a substrate to be printed.

Optionally, the printhead adjustment apparatus is configured for use in a single pass printer. For example, the single pass printer may comprise a cylindrical drum.

Also disclosed herein is a printhead adjustment assembly comprising a printhead adjustment apparatus as disclosed herein, further comprising a support structure coupled between the printhead adjustment apparatus and the printhead, wherein the printhead support structure is configured to couple the translation and/or rotation of the printhead adjustment apparatus to the printhead.

Optionally the support structure may be elongate. Optionally, the support structure may be a frame. Optionally, the support structure may be lightweight. Optionally, the support structure may be rigid. Optionally, the support structure is adapted to receive the printhead and the printhead adjustment apparatus at opposing vertical faces. Optionally, the support structure is adapted to receive a cable from the printhead in the bottom face and feed it through a side face.

Also disclosed herein is a printhead assembly comprising: a plurality of printheads arranged in a print carriage, each of the plurality of printheads comprising an array of nozzles for depositing ink onto a substrate; a printhead adjustment apparatus as disclosed herein coupled to each of the plurality of printheads for adjusting the translation and rotation of each of the plurality of printheads.

Optionally, the plurality of printheads may be arranged around a cylindrical drum, for example on a single pass printer.

Also disclosed herein is a method of manufacturing a printhead adjustment apparatus as disclosed herein, comprising the steps of: providing a printhead attachment; removing selected parts of the printhead adjustment apparatus to form a first flexure arrangement between a first actuator and a first portion, and to form a second flexure arrangement between a second actuator and a second portion; wherein the first flexure arrangement is configured to convert translation of the first actuator into translation of the first portion; and wherein the second flexure arrangement is configured to convert translation of the second actuator into translation of the second portion.

Also disclosed herein is a method of adjusting a printhead, comprising: translating a first actuator coupled to a first portion via a first flexure arrangement; translating a second actuator coupled to a second portion via a second flexure arrangement; wherein the first portion and the second portion are coupled to a printhead; wherein translation of the first actuator and the second actuator in the same direction as each other causes translation of the printhead; and wherein translation of the first actuator and the second actuator in opposite directions to each other causes rotation of the printhead.

Also disclosed herein is a printhead adjustment apparatus for adjusting the translation and rotation of a printhead, comprising: a first portion arranged for coupling to the printhead; a second portion arranged for coupling to the printhead; a first actuator coupled to the first portion by a first adjustment means; a second actuator coupled to the second portion by a second adjustment means; wherein translation of the first and second actuators in the same direction as each other causes translation of the first and second portions in the same direction as each other to provide translation of the printhead; and wherein translation of the first and second actuators in opposite directions to each other causes translation of the first and second portions in opposite directions to each other to provide rotation of the printhead. Therefore, the adjustment means may comprise a flexure arrangement, or may be provided by another arrangement.

The present disclosure will now be described, purely by way of example, with reference to the accompanying drawings, in which.

SPECIFIC DESCRIPTION

Figure 1:
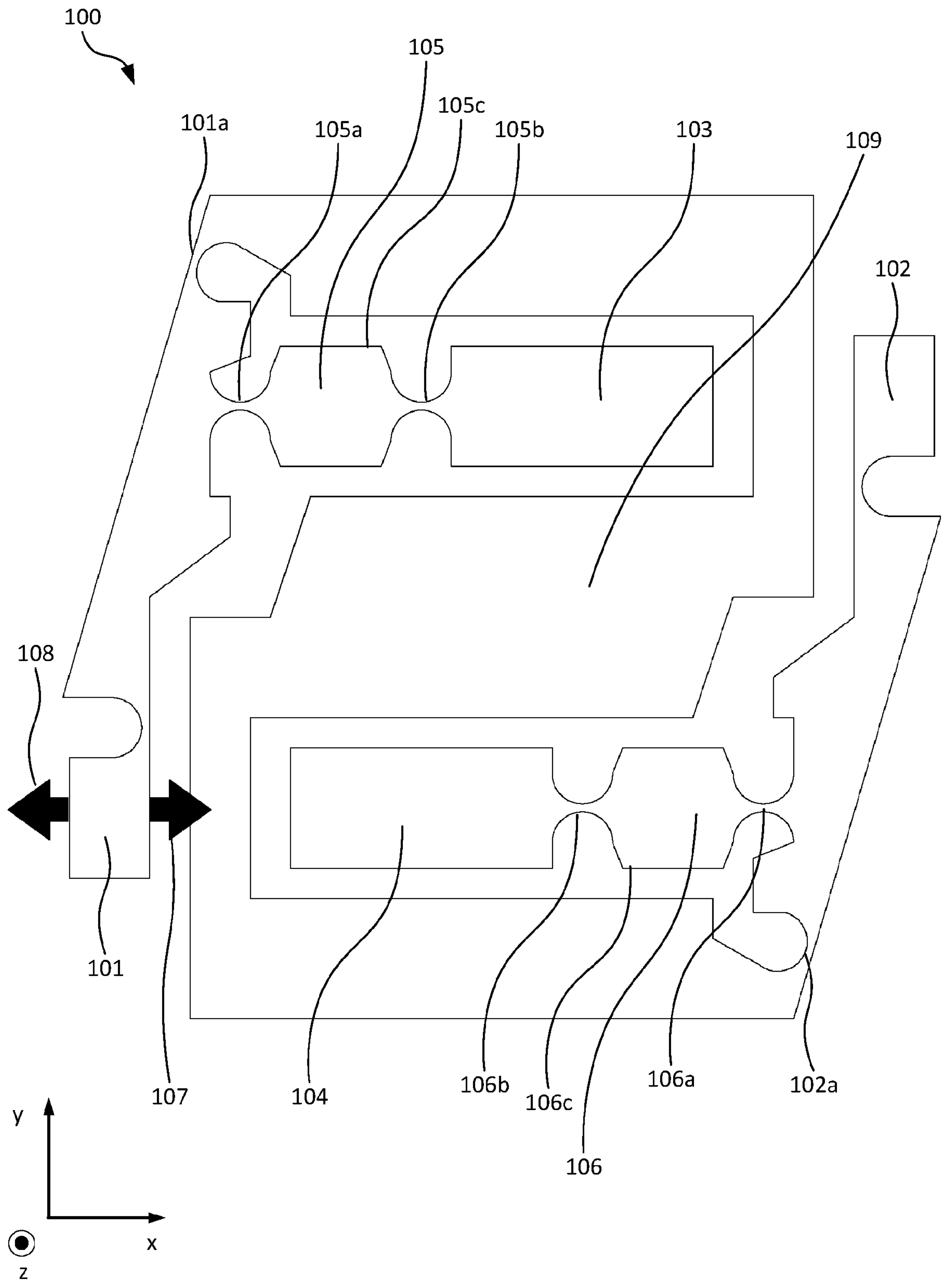
FIG. 1 shows an example embodiment of a printhead adjustment attachment.

FIG. 1 shows a top-down view of a printhead adjustment apparatus 100. The printhead adjustment apparatus 100 is used to provide translation and/or rotation to a printhead. The printhead has been omitted from this figure for the clarity of other features. The apparatus 100 comprises a first portion 103 arranged for coupling to a printhead. The apparatus 100 also comprises a second portion 104 arranged for coupling to the same printhead. The apparatus 100 comprises a first actuator 101 coupled to the first portion 103 by a first flexure arrangement 105. The apparatus 100 also comprises a second actuator 102 coupled to a second portion 104 by a second flexure arrangement 106.

As will be appreciated in the following discussion, FIG. 1 is a schematic diagram of a printhead adjustment apparatus that may be implemented in one embodiment and this figure is described in order to illustrate the principles of the system. However, many implementations will include additional points of constraint that may be attached to portions illustrated in FIG. 1 via further flexure arrangements in order to further constrain and fine-tune motion within the system. Further embodiments of the apparatus illustrating examples of additional constraints are described below with reference in particular to FIG. 4.

A set of conventional right-hand orthogonal axes are shown in the figures. In use, a printhead is arranged in the x-y plane, and the z-axis would be perpendicular to the printhead. The printhead adjustment apparatus 100 is arranged in the x-y plane and has a vertical thickness in the z-direction. For example, the printhead adjustment apparatus 100 may be mounted above a printhead (in the z-direction).

FIG. 1 shows the apparatus 100 made from a single body. The first actuator 101, second actuator 102, first portion 103, second portion 104, first flexure arrangement 105, and second flexure arrangement 106 are made from a single body. The single body also comprises a central body 109 connecting the first actuator 101 to the second actuator 102. For example, the apparatus 100 may be manufactured as a single extrusion of e.g. aluminium, or it may be 3D printed. Alternatively, the apparatus may be formed by cutting or etching lines into a block of material, for example a metal such as aluminium, so that the material that remains after etching forms the shapes and portions shown in FIG. 1 (or the other figures provided herewith).

The first actuator 101 is operable to be translated, for example in a first direction 107 and a second direction 108, wherein the second direction 108 is opposite to the first direction 107. The first direction 107 and the second direction 108 are both in the x-axis. The first direction 107 is in the positive x-direction. The second direction 108 is in the negative x-direction. The first actuator 101 is constrained to move predominantly in the x-y plane.

When a force is applied to the first actuator 101, for example in the first direction 107, the first actuator 101 is translated in the same direction as the force due to a first pivot 101*a*. The first pivot 101*a* is arranged between the first actuator 101 and the central body 109. In FIG. 1, the first pivot 101*a* is a flexure. The first pivot 101*a* allows the first actuator 101 to be translated relative to the central body 109. The first pivot 101*a* is configured to bend or flex or otherwise pivot to allow the first actuator 101 to move relative to the central body 109, which may remain stationary. As the first pivot 101*a* bends upon a force being exerted on the first actuator 101, the arm of the first actuator (i.e. the section from the end of the actuator 101 to the pivot 101*a*) will rotate about the first pivot 101*a*.

The first portion 103 is coupled to the first actuator 101 by the first flexure arrangement 105. The first flexure arrangement 105 converts the rotation of the arm of the first actuator 101 into translation of the first portion 103. The translation of the first portion 103 will be substantially in the same direction as the translation of the first actuator 101. For example, translation of the first actuator 101 in the first direction 107 causes translation of the first portion 103 in the first direction. The first portion 103 is thereby translated relative to the central body 109.

As shown in FIG. 1, the first flexure arrangement 105 comprises two flexures 105*a* and 105*b*, and a body 105*c* therebetween for converting the translation of the first actuator 101 into translation of the first portion 103. By the term flexure, it is to be understood that this refers to a flexural pivot. The flexures allow the necessary bending or flexing to convert the translation of the first actuator 101 into translation of the first portion 103. In particular, the flexure arrangement allows movement in the x-y plane but inhibits unwanted translation of the first portion 103 in directions out of the plane (e.g. in the z-direction). In this manner, the first portion 103 is constrained to move predominantly in the x-y plane. In this configuration, as translation of the first actuator 101 is in the x-axis, the movement of the first portion 103 is predominantly in the x-axis.

Movement in the z-direction can be inhibited by forming the flexures as thin filaments in the x- or y-direction, while having a larger height in the z-direction. This allows easy bending in the x- and y-directions, while providing resistance to bending in the z-direction. This constrains the motion of the portions to the x-y plane.

The flexures will bend under force from the movement of the first actuator 101 in the x-direction to allow the first portion 103 to predominantly move in the x-direction, but not significantly in the z-direction. Some movement may occur in the y-direction; however, this may be overcome by the inclusion of a further constraint in the y-direction, such as, for example, the third flexure arrangement 413 in FIG. 4.

The flexures are thin, bendable sections or pivots that are configured to flex when a force is applied to them. The first flexure 105*a* is arranged between the first actuator 101 and a body 105*c* of the first flexure arrangement 105. The second flexure 105*b* is arranged between the first portion 103 and the body 105*c* of the first flexure arrangement 105.

The flexures 105*a* and 105*b* are cut out of the existing printhead adjustment apparatus 100. This means that no further parts or material is required, and allows for easier manufacture. The flexures are cut from the single body of the apparatus 100. In this case, the flexures are formed by machining pockets in the single body, leaving a thin section of material. Wire erosion may be used to cut the flexures.

Having an adjustment mechanism that comprises flexures means that locking is not required. Once an adjustment to the actuators has been made, the flexures will maintain their position under continued pressure from the actuators. Flexures do not have backlash or slop, unlike for example, sliding hinges. This provides a significant advantage over previous adjustment mechanisms, increasing the precision of the adjustment made.

Flexures are also resilient to thermal changes and vibration, which leads to reducing the frequency with which printheads need to be realigned.

The following is described in reference to the first flexure arrangement; however, a skilled person would understand that this, and other description with respect to one half of the parallel kinematic operation (e.g. first actuator/first portion/first flexure arrangement), can be applied to the other part (e.g. second actuator/second portion/second flexure arrangement). The first flexure arrangement 105 is positioned at a point along the arm of the first actuator 101 between the first pivot 101*a* and the end of the actuator. The first actuator 101 receives a force towards the end of the actuator furthest from the first pivot 101*a*, such that translation caused by the force is converted into rotation of the arm of the actuator about the pivot. This rotation is converted into translation of the first portion 103 by the first flexure arrangement 105. The flexure arrangement 105 is positioned closer to the pivot 101*a* than to the end of the actuator 101. This provides a lever mechanism which creates a reduction ratio in converting the magnitude of the translation of the actuator 101 into translation of the portion 103. For example, the reduction ratio may be 3:1, in other cases it may be 4:1, 2:1 or 3:2. By providing a reduction ratio, the precision of the adjustment can be improved, and a finer adjustment can be made for a given translation of the actuator.

The features described above with reference to interaction of the first actuator 101, the first portion 103, and first flexure arrangement 105 also apply to the second actuator 102, second portion 104, and second flexure arrangement 106 respectively.

Translation of the second actuator 102 is converted into translation of the second portion 104 in a corresponding manner to that described in reference to the first actuator 101 and the first portion 103. The second actuator 102 is operable to be translated relative to the central portion 109 by means of a second pivot 102*a*. The second actuator 102 is operable to be translated, for example in the first direction 107 and the second direction 108 (i.e. x-axis). The second flexure arrangement 106 comprises a flexure arrangement having two flexures 106*a* and 106*b*, and a body 106*c* therebetween for converting the translation of the second actuator 102 into translation of the second portion 104. Therefore, translation of the second portion 104 in an axis parallel to translation of the first portion 103 can be achieved by translation of the first actuator 101 and second actuator 102, for example in the first direction 107 or the second direction 108.

In use, the apparatus 100 is configured to be coupled to a printhead, wherein the printhead is arranged underneath the apparatus 100 (i.e. in the negative z-direction). This allows the adjustment of the printhead to be effected from above. For example, the printhead may be clamped or fixed directly to the first portion 103 and the second portion 104. In another example, the first portion 103 and second portion 104 are rigidly connected via another portion of the apparatus which is fixed to the printhead, for example via a printhead coupler, or via a support structure as described with reference to FIG. 5.

Although the printhead has been omitted from FIG. 1, the first portion 103 and the second portion 104 may be coupled to a printhead. By translating the actuators and causing the translation of the first portion 103 and the second portion 104, the movement of the printhead can be controlled. Translation of the printhead will be described with reference to FIG. 2.

The first portion 103 and the second portion 104 are arranged in the same plane (i.e. the x-y plane). This causes the translation of the first portion 103 and the second portion 104 to occur in the same plane. For example, this plane may be parallel to the plane in which the printhead is arranged. The translation of the first portion 103 and the second portion 104 occurs in the same plane as the translation of the first actuator 101 and the second actuator 102. Hence the first actuator 101, second actuator 102, first portion 103, and second portion 103 are arranged in the same plane.

The first and second actuators 101/102 are arranged in a non-neutral position. For example, translation of the actuators inwards (i.e. the first actuator 101 in the first direction 107, and the second actuator 102 in the second direction 108) can be effected by pushing the actuators, for example by a translational screw as described below. However, the translation of the actuators can be provided outwardly (i.e. the first actuator 101 in the second direction 108, and the second actuator 102 in the first direction 107) if the actuators are biased to move outwardly. In this manner, the screw can be retracted, and the actuator can be biased against the screw. In other examples, the actuator may be pulled in the outward direction by another mechanism.

The mechanism is compact as the flexures are formed by removal of material from the existing printhead adjustment apparatus, and it does not require additional components. By providing a compact adjustment mechanism, it makes it possible to pack many printheads into a very tight array. This improves the quality of printing, and the speed of printing in multi-pass printers. Space is particularly important for single-pass printers, where printheads are often arranged in a circular arc around a cylindrical drum of a single-pass printer. It is particularly advantageous to provide adjustment of the printheads from above the printhead, as the amount of space increases away from the printhead due to the geometry of the cylindrical drum.

A parallel kinematics system is therefore provided, wherein more than one actuator is operated in combination in order to effect a required movement.

Figure 2:
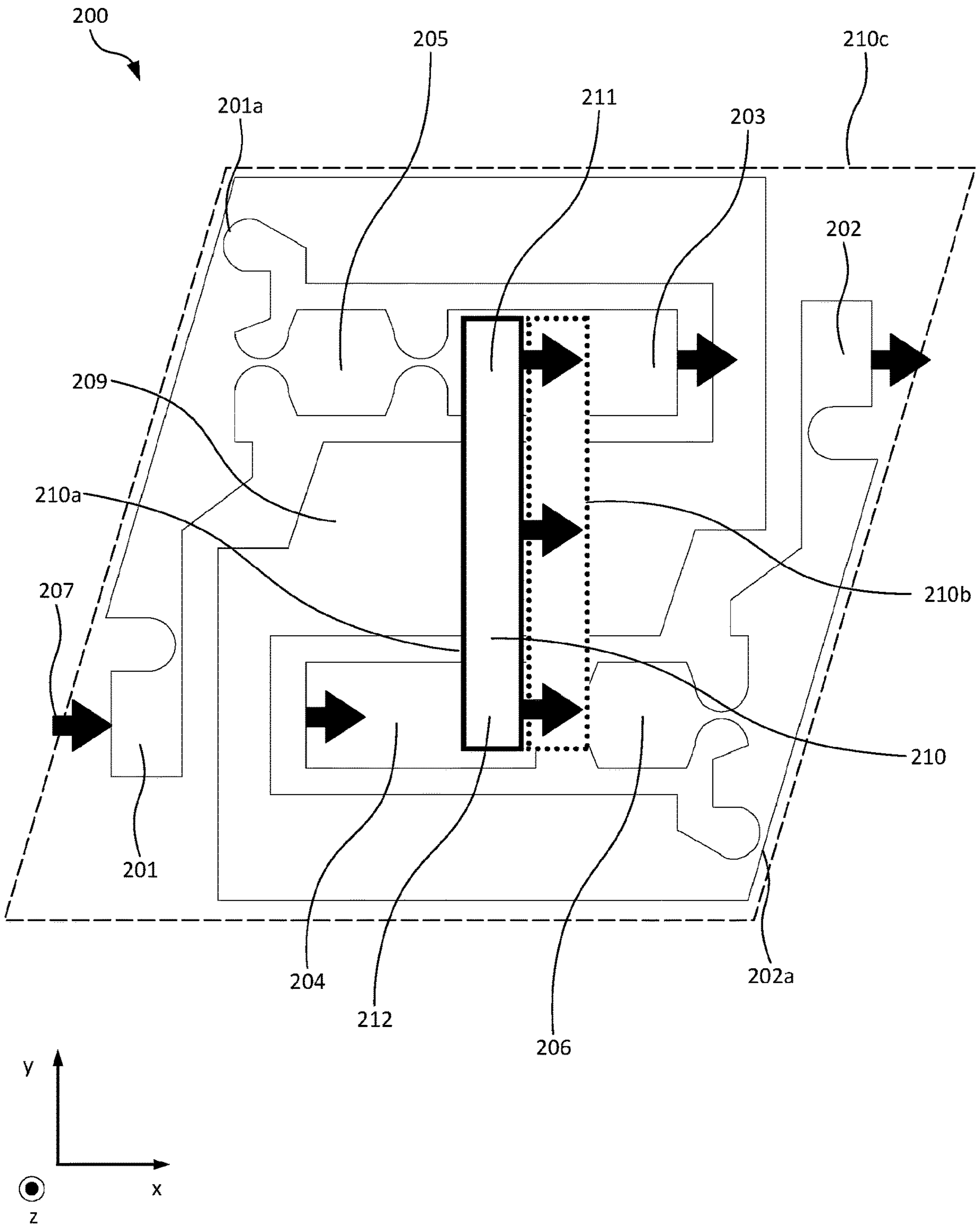
FIG. 2 shows an example embodiment of a printhead adjustment attachment, showing translation of a printhead.

FIG. 2 shows an example embodiment of a printhead adjustment apparatus 200 wherein the first actuator 201 and the second actuator 202 are both translated in the same direction. The apparatus 200 may be the same apparatus as the apparatus 100 described with reference to FIG. 1. The apparatus 200 comprises a first portion 203 arranged for coupling to a printhead 210. The apparatus 200 comprises a second portion 204 arranged for coupling to the same printhead 210.

A simplified shape of the printhead 210 is shown for simplicity and the clarity of other features in FIG. 2. In practice, the printhead 210 may be a parallelepiped shape, for example complementary to the outer shape of the apparatus 200. An example practical shape of the printhead 210 with a parallelogram cross-section is shown in FIG. 2 illustrated by dotted line 210*c*. In some examples, the apparatus 200 has a complementary footprint shape and similar size to the printhead 210, and in some examples is slightly smaller.

The apparatus 200 comprises a first actuator 201 coupled to the first portion 203 by a first flexure arrangement 205. The apparatus 200 also comprises a second actuator 202 coupled to the second portion 204 by a second flexure arrangement 206.

The first actuator 201 is translated in a first direction 207 (positive x-direction), which causes the translation of the first portion 203 in the first direction 207 due to the first flexure arrangement 205 as described above. The second actuator 202 is also translated in the first direction 207 (positive x-direction), which causes the translation of the second portion 204 in the first direction 207 due to the second flexure arrangement 206.

The printhead 210 is coupled to the first portion 203 and the second portion 204. In particular, the first portion 203 is coupled to a first end 211 of the printhead 210 and the second portion 204 is coupled to a second end 212 of the printhead 210. Therefore, movement of the first portion 203 and the second portion 204 determines the movement of the printhead 210. The printhead 210 is translated in the first direction 207 as the first portion 203 and the second portion 204 are translated in the first direction 207. Exclusive translation (i.e. substantially no rotation) of the printhead 210 will be effected if the translation of the first portion 203 is equal to the translation of the second portion 204. This means that each end 211/212 of the printhead 210 is translated by an equal amount and in a parallel direction.

When no force is applied to the first actuator 201 or the second actuator 202, the printhead 210 is positioned in an original position 210*a*. Due to the translation of the first portion 203 and the second portion 204, the printhead 210 is translated to a translated position 210*b*. The translated position 210*b* of the printhead 210 is shown in FIG. 2 by a dashed line, indicating the direction in which the printhead 210 would be translated. In practice, the first portion 203 and the second portion 204 would move with the printhead 210 as it is translated, although this is not shown in FIG. 2 for simplicity.

Figure 3:
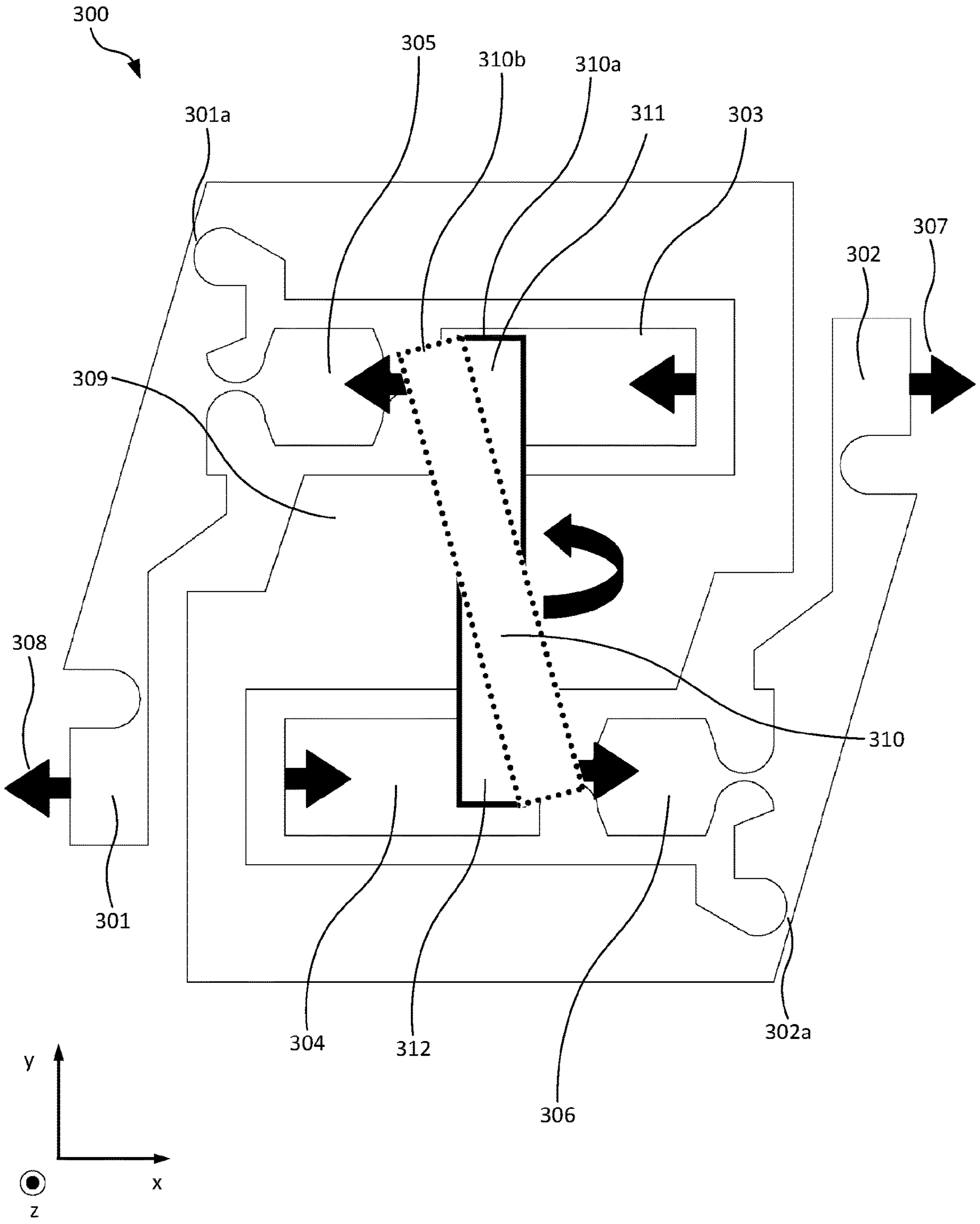
FIG. 3 shows an example embodiment of a printhead adjustment attachment, showing rotation of a printhead.

FIG. 3 shows an example embodiment of a printhead adjustment apparatus 300 wherein the first actuator 301 is translated in the second direction 308 and the second actuator 302 is translated in the first direction 307. The apparatus 300 comprises a first actuator 301 coupled to a first portion 303 by a first flexure arrangement 305. The apparatus 300 also comprises a second actuator 302 coupled to a second portion 304 by a second flexure arrangement 306.

The second actuator 302 is translated in the first direction 307, which causes the translation of the second portion 304 in the first direction 307 due to the second flexure arrangement 306. The first actuator 301 is translated in the second direction 308, wherein the second direction 308 is opposite to the first direction 307. This causes the translation of the first portion 303 in the second direction 308 due to the first flexure arrangement 305. The first portion 303 is translated in the opposite direction to the second portion 304.

The first portion 303 and the second portion 304 are coupled to a printhead 310, as described above. As shown in FIG. 3, a first end 311 of the printhead 310 is coupled to the first portion 303 and a second end 312 of the printhead 310 is coupled to the second portion 304. As the first portion 303 moves in the second direction 308, the first end 311 of the printhead 310 moves in the second direction 308 (the negative x-direction). As the second portion 304 moves in the first direction 307, the second end 312 of the printhead 310 moves in the first direction 307 (the positive x-direction). This causes the printhead 310 to rotate in the x-y plane. In this scenario, the rotation will occur in an anticlockwise direction. The rotation will occur about a point equidistant between the points of coupling of the first end 311 to the first portion 303 and the second end 312 to the second portion 304. For example, this may be configured to coincide with the centre of the printhead. It would be apparent to a skilled person that if both the translations were reversed, rotation in the opposite direction (clockwise) could be achieved.

In this manner, rotation of the printhead can be effected by translation of the first and second portions in opposite directions, which in turn can be effected by translation of the first and second actuators in opposite directions. Translation of the printhead is provided by translation of the first and second portions in the same direction, while rotation of the printhead is provided by translation of the first and second portions in opposite directions.

If the translation of the first portion 303 and the translation of the second portion 304 are equal in magnitude, the movement of the printhead 310 will exclusively be rotation (and substantially no translation).

Figure 4:
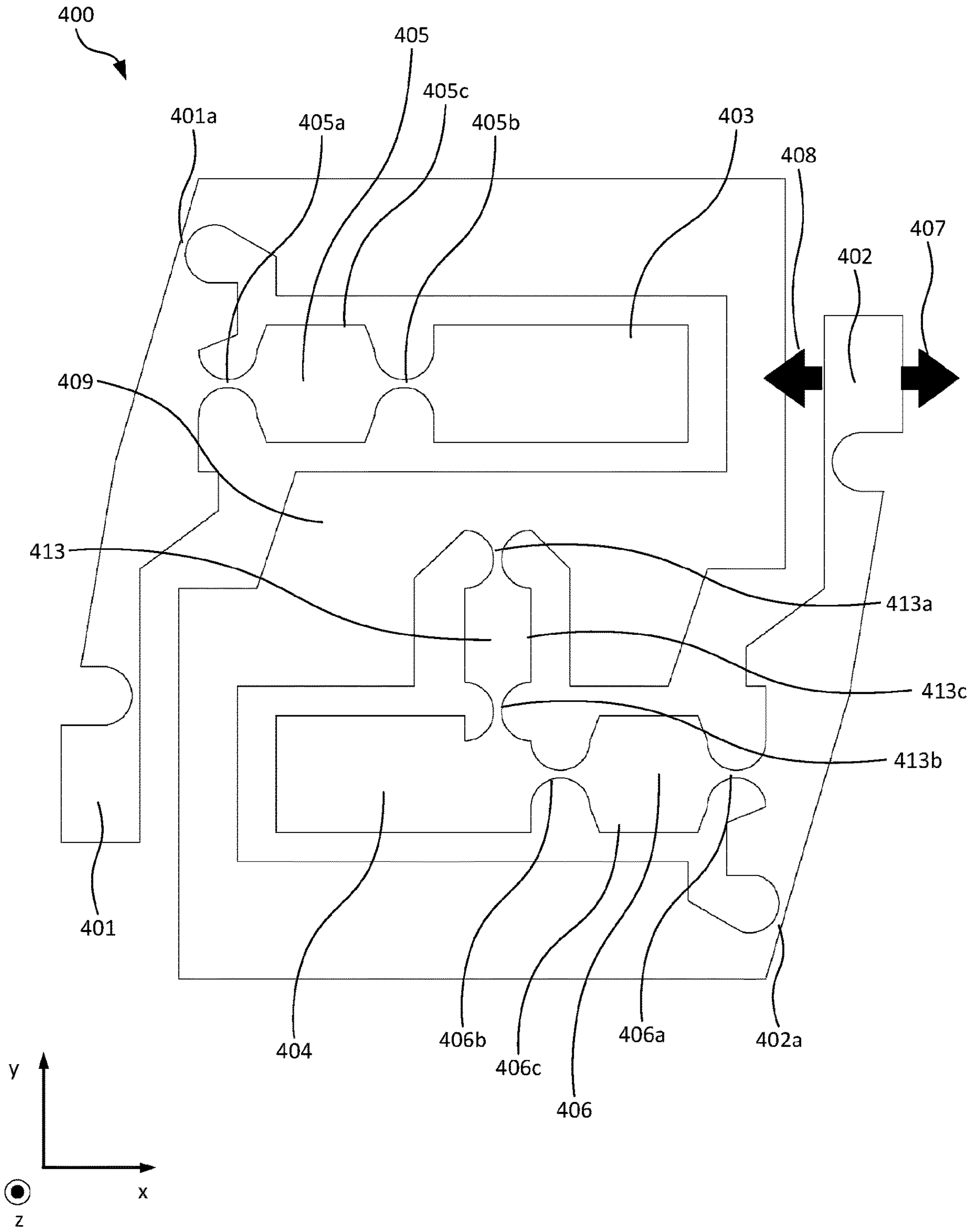
FIG. 4 shows an example embodiment of a printhead adjustment attachment, constrained in the y-axis.

FIG. 4 shows an example embodiment of a printhead adjustment apparatus 400 having a first portion 403 and second portion 404, further constrained to inhibit movement in the y-direction. The apparatus 400 comprises a first actuator 401 coupled to a first portion 403 by a first flexure arrangement 405. The apparatus 400 also comprises a second actuator 402 coupled to a second portion 404 by a second flexure arrangement 406.

As described above, translation of the first actuator 401 and the second actuator 402 in the same direction will cause translation of the printhead in that direction, while translation of the first actuator 401 and the second actuator 402 in opposite directions will cause rotation of the printhead. In order to ensure that translation of each actuator causes the desired translation of the respective portion, the portion can be constrained to prevent movement in an undesired direction, or to constrain movement to be predominantly in the desired direction. For example, if the second actuator 402 is required to be translated in the first direction 407 or the second direction 408 (i.e. along the x-axis), the second portion 404 can be constrained to inhibit movement along the y-axis. In other examples, it may be constrained to only move in the first direction 407 and the second direction 408. By removing a degree of freedom, this ensures that the translation of the second portion 404 is parallel to the translation of the second actuator 402. This can also be used to ensure that the translation of the second portion 404 is parallel to the translation of the first portion 403. The same principle can be applied instead to the first portion 403.

In the configuration of FIGS. 1-3, the portions are constrained by the flexure arrangements to move in the x-y plane (the flexure arrangements inhibit movement in the z-axis). However, the portions can be further constrained to remove a degree of freedom by inhibiting movement in the y-direction, leaving the translation in the x-axis.

For example, in FIG. 4, the second portion is constrained to predominantly move in the first and second directions 407/408 (i.e. along the x-axis) through the use of a third flexure arrangement 413. The third flexure arrangement 413 is arranged in the y-direction which is perpendicular to the x-direction, and hence the first direction 407 and the second direction 408. The third flexure arrangement 413 is in the plane of the apparatus 400. The third flexure arrangement 413 is in the plane of rotation of the printhead. The third flexure arrangement 413 is in the same plane as the first flexure arrangement 405 and the second flexure arrangement 406.

FIG. 4 shows a third flexure arrangement 413 arranged between the second portion 404 and the central body 409 of the apparatus 400. The second portion 404 is coupled to the central body 409 by the third flexure arrangement 413. This constrains the movement of the second portion 404 and inhibits movement in the y-axis (perpendicular to the first direction 407 and the second direction 408).

The third flexure arrangement 413 comprises two flexures 413*a* and 413*b*. The flexure arrangement is configured to provide stability and inhibit unwanted translation in the y-axis.

Furthermore, as the first portion 403 and the second portion 404 are coupled via the printhead, the constraint imposed by the third flexure arrangement 413 also acts on the first portion 403. In this manner, the movement of the first portion 403 is also inhibited in the y-axis.

The third flexure arrangement 413 allows the translation of the second portion 404 in an arc-like path in the x-y plane, which, in small movements will appear as linear movement in the x-direction. This constrains the second portion 404 to inhibit substantial movement in the y-direction.

In use, as the first portion 403 and the second portion 404 are coupled via the printhead, it is not necessary to constrain both portions in the y-axis, for example by using a third flexure arrangement 413 on each of the first and second portions 403/404. Therefore, a third flexure arrangement 413 in the y-axis is shown attaching the central body 409 to the second portion 404 and not to the first portion 403. Moreover, as the skilled person will appreciate, the third flexure arrangement may be implemented between the first portion 403 and the central body 409 to constrain y-axis movement of the first portion 403 rather than directly constraining the second portion 404.

As the first and second portions are constrained to inhibit translation in the y-axis, precise translation in the x-direction without unwanted translation in the y-direction can be achieved. This provides a kinematics system with parallel translation of the actuators causing parallel translation of the portions which leads to translation (if the portion translations are in the same direction) or rotation (if the portion translations are in opposite directions) of the printhead.

Figure 5A:
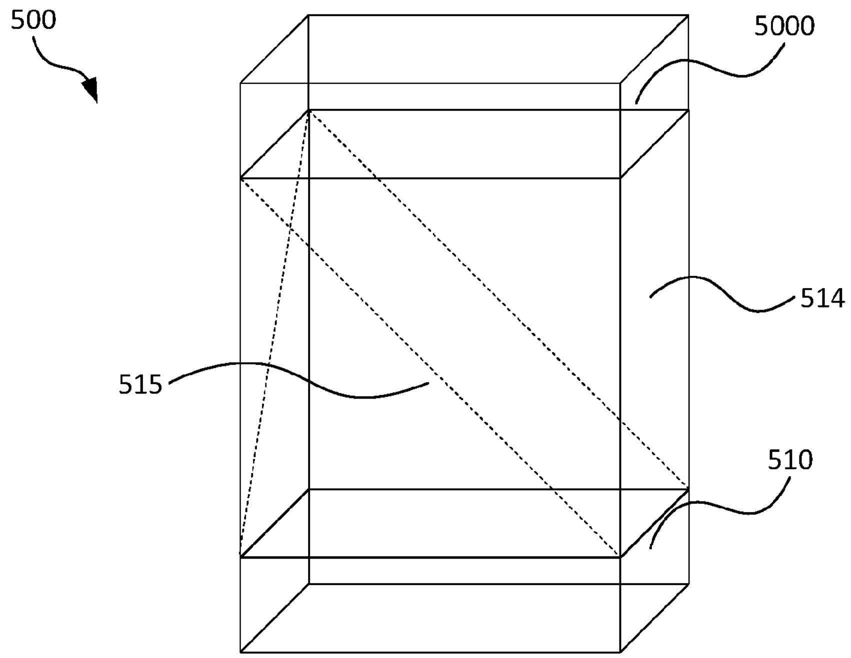
FIG. 5A shows an example embodiment of a printhead, printhead support structure, and printhead adjustment attachment.
Figure 5B:
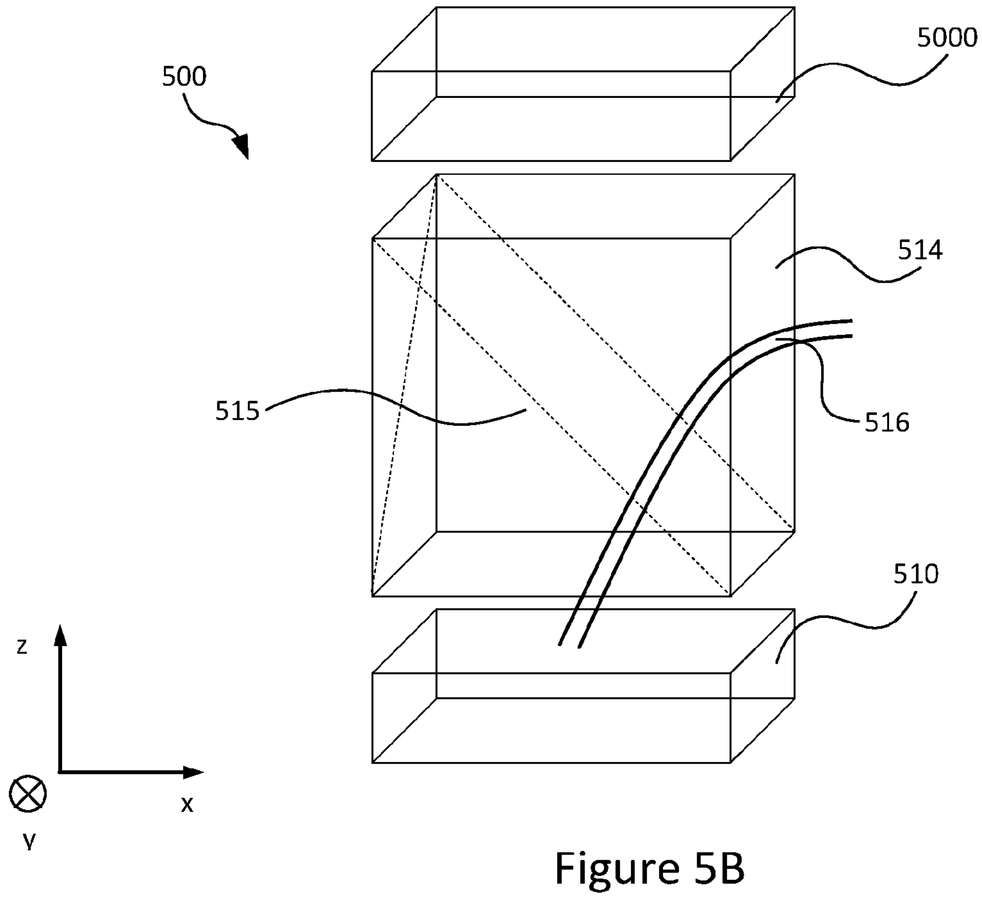
FIG. 5B shows an exploded view of an example embodiment of a printhead, printhead support structure, and printhead adjustment attachment.

FIG. 5A shows a 3D perspective view of a printhead adjustment assembly 500. FIG. 5B shows the same figure, but in an exploded view. The assembly 500 comprises a printhead adjustment apparatus 5000 such as described herein. For example, the printhead adjustment apparatus 5000 may comprise any of the features described above, or with reference to apparatus 100, 200, 300, or 400 of FIGS. 1-4 respectively. In particular, it may comprise a pair of parallel actuators configured to translate a pair of portions, as described above. As in the previous figures, the adjustment apparatus 5000 is arranged in the x-y plane, with a thickness in the z-direction.

The printhead adjustment apparatus 5000 is coupled to a printhead support structure 514. The bottom of the printhead adjustment apparatus 5000 (i.e. in the negative z-direction) is attached to the top of the support structure 514. For example, the support structure 514 may comprise a recess for receiving the apparatus 5000. In other examples, the structure 514 is connected to the apparatus by attachment means, such as screws. The opposite end of the support structure 514 is coupled to a printhead 510. For example, the printhead 510 may comprise an array of nozzles on the bottom face (i.e. negative z-direction, and opposite side to that coupled to the support structure 514).

The apparatus 5000, structure 514 and printhead 510 may all have the same cross-sectional shape in the x-y plane. For example, FIG. 5 shows this as a square/rectangular shape. In this manner, the support structure 514 and apparatus 5000 may have the same footprint as the printhead 510. In some examples, each may have a parallelogram-shaped footprint, for example as shown in FIG. 2. However, other shapes are envisaged, such as square, rectangle, trapezium etc.

In some examples, a separate printhead coupler may be arranged between the adjustment apparatus 5000 and the support structure 514. For example, this may be arranged to couple to the first and second portions, e.g. by an attachment means such as screws. The coupler may be configured to convert the motion of the portions into motion of the coupler. In some examples, the coupler may have the same cross-sectional shape as the support structure 514 e.g. parallelogram.

In particular, the support structure 514 is coupled to the first and second portions of the apparatus 5000. This causes the translation of the first and second portions to be converted into motion of the support structure 514. In turn, the support structure 514 converts this into motion of the printhead 510. The printhead 510 is coupled to the first and second portions via the support structure. Therefore, as the portions move, the support structure 514 and the printhead 510 also move.

For example, if the first and second portions translate in the same direction (e.g. the x-direction), the support structure 514 is translated in that direction. Hence, the printhead 510 is also translated in that direction. If the first and second portions are translated in opposing directions, the support structure 514 is rotated (in the x-y plane), causing rotation of the printhead 510. This provides the parallel kinematic system described above.

The support structure 514 may be a frame, tube, or lattice-like structure. For example, it may be a lightweight, rigid, and stable structure, such as those used in tower cranes or steel bridges etc. The structure 514 does not need to be completely solid. The structure 514 is provided to couple the motion of the portions to the printhead 510. The structure 514 also allows the adjustment apparatus 5000 to be raised above the printhead 514. For the reasons described above, this is preferential as it provides more space for the adjustment of the printhead 510. For example, motors and necessary cabling can be provided above the apparatus 5000 for effecting translation of the actuators. In particular, when a cylindrical drum is used (e.g. in a single pass printer), the amount of space increases with vertical height (z-direction) away from the cylindrical drum.

The structure 514 may be 3D printed, or it may be formed of a lightweight metal or other material, e.g. aluminium. For example, it may be formed by extrusion.

The structure 514 may comprise a frame shape with pillars in the four corners as shown in FIG. 5. In addition, cross linkages 515 across the frame may be provided for added structural support and rigidity, if necessary. The structure 514 may also have one face open, such that it forms a U-shape in the x-y plane. For example, this may include not providing any cross-linkages 515 on one face. This can be provided to allow space for routing cables and tubes from the printhead 510. Cables such as those for electrical power and tubes for providing ink may exit the printhead 510 above (positive x-direction), and as such need to be routed out of the structure. This may be achieved through one open face of the support structure 514 to reduce space. For example, this is shown in FIG. 5B, where a cable/tube 516 is routed from the top of the printhead 510 through an open bottom face of the structure 514 and inside the frame, and is routed out the side of the open face (on the right-hand side, in the y-z plane). The other three faces are shown to have a cross-linkage 515 across the face. Other more complex cross-linkages may be present.

A calculation of the constraints that usefully be provided in embodiments of the adjustment apparatus can be made using Grübler's equation:

$$D=3(L-1)-2P$$

In Grübler's equation, D is the required number of degrees of freedom, L is the number of linkages, and P is the number of pivots.

When applied to the parallel kinematic adjuster of FIG. 4, one degree of freedom of translation and one degree of freedom for rotation is required, giving a total of two required degrees of freedom.

The number of degrees of freedom provided by the embodiment of FIG. 4 can be calculated by using Grübler's equation. The number of linkages and pivots must be calculated. The first actuator 401 (first linkage) is connected to the central body 409 (second linkage) by the first pivot 401*a* (first pivot). The central body 409 is connected to the second actuator 402 (third linkage) by the second pivot 402*a* (second pivot).

The first actuator 401 is also connected to the body 405*c* (fourth linkage) of the first flexure arrangement 405 by the first flexure 405*a* (third pivot). The body 405*c* of the first flexure arrangement 405 is connected to the first portion 403 (fifth linkage) by the second flexure 405*b* (fourth pivot).

The second actuator 402 is also connected to the body 406*c* (sixth linkage) of the second flexure arrangement 406 by the third flexure 406*a* (fifth pivot). The body 406*c* of the second flexure arrangement 406 is connected to the second portion 404 by the fourth flexure 406*b* (sixth pivot). The first portion 403 and the second portion 404 are constrained to be coupled rigidly via the printhead, and as such act as a single linkage (both the fifth linkage).

The second portion 404 is further connected to the body 413*c* (seventh linkage) of the third flexure arrangement 413 by the fifth flexure 413*b* (seventh pivot). The body 413*c* of the third flexure arrangement 413 is connected to the central body 409 (second linkage) by the sixth flexure 413*a* (eighth pivot).

This means that in total, there are L=7 linkages, and P=8 pivots. Therefore, by Grübler's equation, the number of degrees of freedom is $D=3*(7-1)-2*(8)=2$. This provides one degree of freedom of translation, and one degree of freedom of rotation. Therefore, the embodiment of FIG. 4 is properly constrained to inhibit unwanted translation e.g. in the y- and z-axes, e.g. perpendicular to the first direction 407.

It can be seen that the inclusion of the third flexure arrangement 413 improves the stability by constraining the motion and removing undesirable translations, over examples without the third flexure arrangement 413, for example in the simplified embodiments of FIGS. 1-3. If Grübler's equation was to be solved for L=5 linkages, and P=6 pivots, then the number of degrees of freedom would be $D=3*(6-1)-2*(6)=3$. This provides three degrees of freedom, allowing movement in an unwanted direction, and showing the advantage of including the third flexure arrangement 413.

Alternatives and Extensions

As the skilled person will appreciate, the printhead adjustment apparatus may be implemented using other arrangements of pivots, flexures and actuators. In particular, in other examples, translation of the first actuator in the first direction may cause translation of the first portion in the second direction. Furthermore, in other examples, the actuators may be operated from the other edges of the apparatus (the top and bottom edges of the apparatus in the present figures) with the flexure arrangement being arranged such that movement of the actuators along the y-axis causes movement of the first and second portions along the x-axis.

A plurality of printheads may be provided around a cylindrical drum of a single pass printer, wherein each printhead has a printhead adjustment apparatus coupled to the distal side in relation to the drum. In this arrangement, there is more space between the printheads as the distance from the drum is increased. This allows greater space for adjustment.

Consider FIG. 1, in particular a flexure such as the first flexure 105*a* of the first flexure arrangement 105. The first flexure 105*a* extends in the x-direction, and is thin in the y-direction, allowing flexing in the x-y plane. Unwanted movement in the z-direction can be inhibited by forming the flexures as thin in the x-direction, but tall in the z-direction to provide a high degree of z-stiffness. For example, the height of the flexure in the z-direction may be many times greater than the thickness in the y-direction. This can also be applied to flexures orientated in the y-direction, for example flexure 413*a/b*.

Furthermore, movement in the z-direction may be further inhibited by providing a flexure arrangement arranged in the z-axis. For example, the central body may be connected to the first and/or second portions via a fourth flexure arrangement comprising flexures arranged in the z-axis. This constrains the first and second portions to inhibit movement in the z-axis.

Translation of the first actuator and/or the second actuator may be effected by, for example, an adjuster screw. For effecting translation in the first direction and the second direction, the adjuster screw is provided with an axis along the first/second direction (i.e. along the x-axis). Rotation of the adjuster screw provides the translation of the first and/or second actuator. The screw may be manually adjusted.

Translation of the first actuator and the second actuator may be controlled by a motor. For example, the motor may be a stepper motor. The motor may be controlled by a processor such that a computer calculates necessary movement of each actuator and precisely effects the movement through the motor. This enables greater precision than human operation. In some examples, the motor is used to control the rotation of the adjuster screw for translating the actuators. The adjustment may also be automatically controlled without the need for manual intervention, and potentially from a distance, for example over a network connection. Computers eliminate "human error" and can also perform tasks quicker than a human operator and/or control multiple tasks at once. By using stepper motors in combination with fine pitched leadscrews, the system remains in position when power is removed. This eliminates the need for a locking device. Typically, adjustment mechanisms require a cycle of: unlock, adjust, and lock. The locking phase often introduces some unwanted movement which decreases the precision of the adjustment. The locking step also makes the system harder to automate. The present disclosure avoids a locking step because flexures do not have any backlash or slop, unlike e.g. a sliding hinge, and therefore do not require a locking or securing component. This provides a more compact, and precise system which is easier to manufacture.

In some examples, a printhead coupler is arranged between the apparatus and the printhead.

In some embodiments, the third flexure arrangement 413 is omitted to provide a 3-degree of freedom structure with another adjuster to control the y position. In practice, precise adjustment in the y-axis may not be critical, as the phasing of when droplets are ejected from the printheads can be adjusted to make up for differences in the relative y-positions of the heads. However, in some embodiments, flexure 413*a* could be coupled to a moving part (rather than on to central body 409) and a third actuator may be provided between that new moving part and central body 409 to provide an independent adjustment in the y-direction.

The invention claimed is:

1. A printhead adjustment apparatus for adjusting the translation and rotation of a printhead, comprising:

a first portion arranged for coupling to the printhead;

a second portion arranged for coupling to the printhead;

a first arm, and a first actuator positioned at a first end of the first arm, wherein the first arm is coupled to the first portion by a first flexure arrangement;

a second arm, and a second actuator positioned at a first end of the second arm, wherein the second arm is coupled to the second portion by a second flexure arrangement;

a central body arranged between the first actuator and the second actuator and having first and second opposite central body sides, the first central body side adjacent the first actuator and connected to the second arm and the second central body side adjacent the second actuator and connected to the first arm;

a first pivot at a second end of the first arm opposite the first end of the first arm, the first pivot connecting the first arm to the central body for permitting movement of the first arm relative to the central body in response to translation of the first actuator;

a second pivot at a second end of the second arm opposite the first end of the second arm, the second pivot connecting the second arm to the central body for permitting movement of the second arm relative to the central body in response to translation of the second actuator; and a printhead coupler coupled to and arranged between the printhead and the first portion and the second portion, the printhead coupler configured to couple the translation and rotation of the first portion and the second portion to the printhead;

wherein the printhead is configured to translate and rotate relative to the central body while the central body remains stationary;

wherein the first flexure arrangement causes translation of the first portion relative to the central body in response to translation of the first actuator;

wherein the second flexure arrangement causes translation of the second portion relative to the central body in response to translation of the second actuator;

wherein translation of the first and second actuators in the same direction as each other causes translation of the first and second portions in the same direction as each other to provide translation of the printhead;

wherein translation of the first and second actuators in opposite directions to each other causes translation of the first and second portions in opposite directions to each other to provide rotation of the printhead; and wherein the first flexure arrangement is coupled to the first arm at a position along the first arm between the first end of the first arm and the second end of the first arm and closer to the first pivot at the second end of the first arm than to the first actuator at the first end of the first arm to provide a reduction ratio such that a ratio of magnitude of the translation of the first portion to a magnitude of the translation of the first actuator is less than one, or wherein the second flexure arrangement is coupled to the second arm at a position along the second arm between the first end of the second arm and the second end of the second arm and closer to the second pivot at the second end of the second arm than to the second actuator at the first end of the second arm to provide a reduction ratio such that a ratio of a magnitude of the translation of the second portion to a magnitude of the translation of the second actuator is less than one.

2. A printhead adjustment apparatus according to claim 1, wherein each flexure arrangement comprises at least two flexural pivots.

3. A printhead adjustment apparatus according to claim 1, wherein the first and second portions are arranged in the same plane.

4. A printhead adjustment apparatus according to claim 1, wherein the first and second portions are arranged in the same plane.

5. A printhead adjustment apparatus according to claim 1, wherein the translation of the second actuator causes translation of the second portion in substantially the same direction as the translation of the second actuator.

6. A printhead adjustment apparatus according to claim 1, wherein more than one of the following are formed from the same body: the first and second portions, the first and second flexure arrangements, the central body, and/or the first and second actuators.

7. A printhead adjustment apparatus according to claim 1, wherein the first pivot is a flexural pivot.

8. A printhead adjustment apparatus according to claim 1, wherein the second pivot is a flexural pivot.

9. A printhead adjustment apparatus according to claim 1, wherein translation of the first actuator causes rotation of the first actuator about the first pivot and wherein the first flexure arrangement is configured to convert the rotation of the first actuator into translation of the first portion.

10. A printhead adjustment apparatus according to claim 1, wherein translation of the second actuator causes rotation of the second actuator about the second pivot and wherein the second flexure arrangement is configured to convert the rotation of the second actuator into translation of the second portion.

11. A printhead adjustment apparatus according to claim 1, further comprising a printhead coupled to the first and second portions, wherein the printhead comprises an array of nozzles for depositing ink, the array of nozzles arranged in a plane.

12. A printhead adjustment apparatus according to claim 11, wherein the translation of the first and second portions occurs in a plane parallel to the array of nozzles of the printhead.

13. A printhead adjustment apparatus according to claim 1, wherein the first and second portions are each constrained to move predominantly in a first direction and a second direction, wherein the second direction is opposite to the first direction.

14. A printhead assembly comprising:

a plurality of printheads arranged in a print carriage, each of the plurality of printheads comprising an array of nozzles for depositing ink onto a substrate;

a printhead adjustment apparatus coupled to each of the plurality of printheads for adjusting the translation and rotation of a printhead of the plurality of printheads, each printhead adjustment apparatus comprising:

a first portion arranged for coupling to a printhead of the plurality of printheads;

a second portion arranged for coupling to the printhead;

a first arm, and a first actuator positioned at a first end of the first arm, wherein the first arm is coupled to the first portion by a first flexure arrangement;

a second arm, and a second actuator positioned at a first end of the second arm, wherein the second arm is coupled to the second portion by a second flexure arrangement;

a central body arranged between the first actuator and the second actuator and having first and second opposite central body sides, the first central body side adjacent the first actuator and connected to the second arm and the second central body side adjacent the second actuator and connected to the first arm;

a first pivot at a second end of the first arm opposite the first end of the first arm, the first pivot connecting the first arm to the central body for permitting movement of the first arm relative to the central body in response to translation of the first actuator;

a second pivot at a second end of the second arm opposite the first end of the second arm, the second pivot connecting the second first arm to the central body for permitting movement of the second arm relative to the central body in response to translation of the second actuator; and a printhead coupler coupled to and arranged between the printhead and the first portion and the second portion, the printhead coupler configured to couple the translation and rotation of the first portion and second portion to the printhead;

wherein the printhead is configured to translate and rotate relative to the central body while the central body remains stationary;

wherein the first flexure arrangement causes translation of the first portion relative to the central body in response to translation of the first actuator;

wherein the second flexure arrangement causes translation of the second portion relative to the central body in response to translation of the second actuator;

wherein translation of the first and second actuators in the same direction as each other causes translation of the first and second portions in the same direction as each other to provide translation of the printhead;

wherein translation of the first and second actuators in opposite directions to each other causes translation of the first and second portions in opposite directions to each other to provide rotation of the printhead; and wherein the first flexure arrangement is coupled to the first arm at position along the first arm between the first end of the first arm and the second end of the first arm and closer to the first pivot at the second end of the first arm than to the first actuator at the first end of the first arm to provide a reduction ratio such that a ratio of a magnitude of the translation of the first portion to a magnitude of the translation of the first actuator is less than one, or wherein the second flexure arrangement is coupled to the second arm at a position along the second arm between the first end of the second arm and the second end of the second arm and closer to the second pivot at the second end of the second arm than to the second actuator at the first end of the second arm to provide a reduction ratio such that a ratio of a magnitude of the translation of the second portion to a magnitude of the translation of the second actuator is less than one.

15. A method of manufacturing a printhead adjustment apparatus according to claim 1, comprising the steps of:

providing a printhead attachment;

removing selected parts of the printhead adjustment apparatus to form a first flexure arrangement between a first actuator and a first portion, and to form a second flexure arrangement between a second actuator and a second portion; wherein the first flexure arrangement is configured to convert translation of the first actuator into translation of the first portion;

and wherein the second flexure arrangement is configured to convert translation of the second actuator into translation of the second portion.

* * * * *